3,010,976
SYNTHETIC ESTERS OF EPOXIDIZED DIENE POLYMERS AND PROCESS OF MAKING SAME
Frank P. Greenspan, Williamsville, and Rupert E. Light, Jr., Kenmore, N.Y., assignors to FMC Corporation, a corporation of Delaware
No Drawing. Filed Nov. 5, 1956, Ser. No. 620,193
7 Claims. (Cl. 260—410.6)

This invention relates to novel synthetic esters useful in forming surface coatings such as varnishes, enamels and the like, and to a method of preparing these esters from certain modified conjugated diene polymers.

The conjugated diene polymers, for example polybutadiene, polyisoprene and copolymers of the conjugated dienes with ethylene monomers of the type of styrene and acrylonitrile can be applied to surfaces and hardened thereon through a process of oxidative crosslinking to form useful coatings. However, these materials have not met with extended acceptance for the reason that they are incompatible with many resins and other compounding ingredients normally used in the formation of coatings, and for the further reason that they are expensive.

It is a feature of this invention to provide stable, inexpensive synthetic esters which are useful alone or compounded with a variety of other esters, resins and the like in forming coating compositions and a method of producing these esters efficiently and rapidly from modified conjugated diene polymers.

It is a further feature of this invention to provide such esters which can be converted readily to infusible, insoluble condition either through oxidative crosslinking or by reaction of highly reactive functional groups contained therein.

In accoradnce with the method of this invention, an epoxidized conjugated diene polymer is reacted with a fatty acid to provide an ester. The epoxidized conjugated diene polymer which is useful in forming the ester is a stable, thermoplastic polymer formed by reaction of the polymer with a lower aliphatic peracid. This modified polymer has a high ratio of epoxy to non-epoxy oxygen, such that at least 50% of the total oxygen introduced into the polymer by reaction with the peracid, that is of the total peracid-introduced oxygen, is epoxy oxygen. The presence of a high ratio of highly reactive epoxy oxygen to non-epoxy oxygen makes possible both extremely rapid esterification of the polymer through epoxy groups, and retention of sufficient epoxy groups following esterification for subsequent curing of the polymer by epoxy group reactions.

The present esters are extremely versatile materials. The esterification reaction in which they are formed can be substantially completed initially, that is to produce a product having an acid number of about 15 or less, or it may be interrupted at an intermediate stage. The latter technique is useful in cases where the ester is to be cured subsequently by heating, it being possible to reduce the acid number of the product by further reaction during the heating operation. Furthermore, as regards curing of the present esters in use, they can be prepared to contain any one of or any desired combination of, (1) unsaturation in the fatty acid residue, (2) residual unsaturation in the conjugated diene polymer portion which is available for drying, that is oxidative crosslinking, and (3) residual epoxy groups in the conjugated diene polymer portion. The sites of unsaturation are capable of undergoing oxidative crosslinking to render the ester infusible and insoluble, while the epoxy groups are reactive either with other epoxy groups or with polyfunctional active hydrogen containing materials to modify the ester and to render it infusible and insoluble. By reason of their ability to crosslink either oxidatively or by epoxy reaction, the esters can be partially or completely converted to infusible and insoluble condition under conditions which may be suited to only one of these reactions, for example in the presence or absence of oxygen, in a bone-dry atmosphere or when immersed in water.

The epoxidized conjugated diene polymer is prepared from a conjugated diene polymer having a molecular weight as measured by the intrinsic viscosity method, of about 250 to 250,000. A suitable method for determining molecular weight by the intrinsic viscosity technique is described in A Molecular Weight-Intrinsic Viscosity Study of Several Diene Polymers, D. J. Pollock et al., Journal Polymer Science, vol. XV, 87–96 (1955). These polymers are formed by polymerization of conjugated dienes having from 4 to 6 carbon atoms, that is butadiene, methyl butadiene, dimethyl butadiene and the like, alone or with ethylene monomers containing the $CH_2=CH-$ group, e.g. styrene, isobutylene, and acrylonitrile. Any of the known polymerization methods can be employed in their formation. Examples of suitable methods are the free radical, the anionic, and the cationic polymerization methods.

The epoxidized conjugated diene polymer is prepared by reacting the conjugated diene polymer with a lower aliphatic peracid which is liquid at or about room temperature. The peracid may be preformed or may be formed in situ in the reaction medium from the corresponding acid and hydrogen peroxide. In the case of the preformed peracid the reaction suitably is conducted by reacting the conjugated diene polymer with about one mole of the peracid per mole of unsaturation desired to be epoxidized to the polymer, at a temperature of from about 35° C. to about 55° C. In the case of the in situ peracid reaction, the conjugated diene polymer, about 0.25 to 1 mole of aliphatic acid per mole of unsaturation in the polymer to be reacted, and where necessary a strong acid catalyst for peracid formation, are mixed and about 1 mole of hydrogen peroxide based on the unsaturation in the polymer to be reacted is added with stirring to this mixture. The temperature of the reaction mixture normally is maintained during this addition at about 45° to 55° C., and following addition of the peroxide the temperature suitably is raised to about 60° to 65° C. where it is maintained until the hydrogen peroxide is substantially completely consumed.

The epoxidation reaction normally is carried out in liquid phase, and for this reason when high melting polymers are to be epoxidized an inert organic solvent, for example benzene, chloroform and the like is used to dissolve the polymer. It is desirable to employ such a solvent even with liquid, that is oil, polymers, however, for the reason that such a solvent minimizes breakdown of epoxy rings formed in the product and likewise represses formation of side products.

The epoxidized polymer prepared as described above suitably is removed from the reaction mixture by washing out impurities with about a 10% water solution of an agent such as sodium sulfate. In systems employing an organic solvent, this ingredient is removed from the product at reduced pressures.

The epoxidation reaction frequently results in production on the polymer of hydroxy, carboxyl, and ester groups, in addition to the desired epoxy groups. The hydroxy and ester groups can react to form esters of the present type, however they react slowly and inefficiently when compared with the epoxy groups. Carbonyl groups, on the other hand, do not react with acids to form esters. Accordingly, presence of any of these groups in the polymer in substantial quantities is of disadvantage in formation of the ester. Likewise, formation of these non-epoxy oxygen containing groups reduces the amount of epoxy oxygen available for subsequent chemical curing of the ester. For these reasons, it has been found important that the ratio of epoxy oxygen to non-epoxy oxygen introduced in the epoxidation by peracid be at least 1:1, and that the epoxidized polymer contain at least about 1% epoxy oxygen. Values for use in establishing this ratio can be determined readily as follows: epoxy oxygen by a modification of the ether-HCl method of Swern et al., see Swern et al., Anal. Chem., 19, 414–15 (1947), the modification consisting of pre-dissolving the sample in benzene, and total oxygen by the Schütze-Unterzaucher method see Elving and Ligett, Chem. Revs., 34, 139 (1944). Alternately, the epoxy oxygen ratio can be determined by analyzing for epoxy, hydroxyl, ester and carbonyl oxygen contents and calculating the epoxy ratio from these values.

It will be apparent that where greater than 50% of the amount of total active oxygen reacted as peracid with the polymer is converted to epoxy oxygen, it will be unnecessary to analyze for total oxygen, as the indicated epoxy ratio of necessity will be greater than 1:1. Further, in cases where the polymer which is epoxidized contains residual oxygen prior to its epoxidation, e.g. vinyl acetate, this oxygen will have to be deducted from total oxygen to determine the amount of peracid-introduced oxygen, that is the oxygen introduced into the polymer during the epoxidation thereof by peracid, in establishing the epoxy ratio.

The present ester is formed by reaction of the epoxidized polymer with a fatty acid. In calculating amounts of acid and epoxidized polymer to be used in forming the ester, it is necessary to consider whether it is desired to react fully the epoxy oxygen in the polymer, or whether it is desired to produce an ester having residual epoxy oxygen which can be used to crosslink the ester chemically by reaction of the epoxy groups. The epoxy equivalent value of the epoxidized polymer, the value employed in formulation calculations, is the amount in grams of epoxidized polymer containing 16 grams of epoxy oxygen. In cases where it is desired to react the epoxy fully, an equivalent weight of fatty acid, that is the weight in grams of the acid containing one carboxylic acid group, is reacted with one equivalent of epoxidized polymer. It is apparent that less than the equivalent amount of fatty acid will be employed where it is desired to leave residual epoxy oxygen in the ester. Likewise, excess acid may be used where it is desired to react hydroxy groups which are formed by esterification of the epoxy groups.

Fatty acids useful herein are the saturated and unsaturated aliphatic acids, preferably those obtained from the fatty oils. Normally the monofunctional fatty acids having from 12 to 24 carbon atoms are employed in forming the ester, although these acids may be replaced in part with higher or lower molecular weight fatty acids and/or with polyfunctional acids. It should be noted, however, that the amount of polyfunctional acids employed should be kept to a minimum, for the reason that these acids when present tend to cause gelation during the esterification reaction. Choice of saturated or unsaturated acids will be made on the bases of the degree of reactivity desired in the ester for oxidative cross-linking.

A suitable esterification method for use herein is the closed kettle fusion method. This involves mixing the acid and epoxidized polymer in a vessel equipped with a mechanical stirrer, heating elements, means for bubbling nitrogen through the batch and a vent to the atmosphere, and thereafter heating the mixture at about 200° to 250° C. with stirring and under a nitrogen atmosphere until the desired acid number is obtained in the reaction mixture. Alternate methods which can be employed suitably are the closed kettle azeotropic method and the open kettle method.

When drying acids, particularly drying acids containing multiple conjugated unsaturation, are to be esterified it is important that care be taken to avoid gelation of the reaction mixture. It should be noted that reaction mixtures containing epoxidized copolymers are superior to reaction mixtures containing the epoxidized polybutadienes in their resistances to gelation.

A suitable modification of the above esterification techniques which is of particular advantage in avoiding gelation of the reaction batch in cases where this is apt to occur, comprises conducting the esterification in an organic solvent having a suitable boiling point, or in the presence of a catalyst for esterification, e.g. lithium hydroxide or trimethylammonium hydroxide.

Likewise, any likelihood of gelation can be avoided as described hereinbefore by interrupting the esterification at an intermediate stage to produce a composition having a high acid number, and further reacting the partially esterified composition subsequently during baking of the composition to provide a coating or other cured product. Preferably the esterification reaction should be carried at least one-third to completion in the initial reaction vessel, that is the acid number of the mixture should be reduced at least one-third in order that the curing schedule for the composition in its application will not be unduly lengthened and further in order that the coating produced will have suitable properties. Coatings formed from these compositions have excellent physical properties as well as high degrees of resistance to acids, alkalies and organic solvents.

The esters are soluble in various mineral spirits, as well as in organic solvents such as benzene, toluene, xylene and the like. Films of these esters can be applied from solution in any of these solvents.

The esters can be compounded with ingredients commonly employed in coating compositions, for example with resins such as the phenol or amine aldehyde resins, the alkyd resins, the resin gums and the like or with suitable plasticizers. Furthermore they may be blended with drying or semi-drying oils to form oleoresinous compositions. Likewise, pigments and dyes can be incorporated in the ester formulation.

Following deposition the esters can be cured to insoluble and infusible condition by oxidative crosslinking, by reaction of epoxy groups in the ester with polyfunctional active hydrogen containing agents and/or by epoxy group interreaction particularly in the presence of catalysts for epoxy crosslinking. The oxidative crosslinking reaction can be effected at room temperature in the presence of such drying catalysts as cobalt, manganese and the like or it can be accelerated with or without addition of a catalyst by the application of heat, e.g. about 100° to 200° C. The epoxy group reactions can be carried out with primary or secondary polyamines, polycarboxylic acids and their anhydrides, polymercaptans, polyphenols and other active hydrogen containing agents, or for example with catalysts for epoxy to epoxy crosslinking such as borontrifluoride or a tertiary amine.

It will be apparent that by reason of their ability to cure by either or both of two completely different mechanisms, the instant esters can be cured under a variety of conditions. Thus, they can be cured in the absence of oxygen through reaction of the epoxy groups with the indicated agents, whereas likewise they can be cured by oxidative crosslinking at room temperature, conditions under which the epoxy reaction frequently does not take place. It will be apparent also that part of the reaction may be conducted at one time and under one set of conditions, and subsequently the remainder of the reaction may be carried out under other, different, conditions. Thus an ester may be cured partially in the absence of oxygen through the epoxy reaction, and curing of the ester completed subsequently when it is possible to supply oxygen for curing.

The present esters are useful in forming coatings on a variety of surfaces, for example on metals, on wood, on cements and on plasters. They are useful also, however, in the formation of such resinous products as linoleums, adhesives, and laminated structures.

The following examples are given by way of illustration only and are not to be construed as limiting the reaction conditions, the reaction ingredients, compounds or methods of use thereof which are within the scope of the present invention.

EXAMPLE 1

77 grams of a peracetic acid epoxidized polybutadiene having a molecular weight of about 1,500 and an epoxy content of 2.3% (77% of the active oxygen employed in epoxidation), and 23 g. of lauric acid were mixed in a vessel equipped with a mechanical stirrer, heating elements, means for bubbling nitrogen vapor through the reaction mixture and a vent to the atmosphere. The mixture was heated at 200° F. for 1 hour with stirring and under a nitrogen atmosphere, and thereafter cooled to room temperature.

A 50% solution of the reaction product was prepared in xylene, and 20 g. of Resimene 875 and 0.5 g. of cobalt octoate were dissolved in 80 g. of this solution. The Resimene 875 is a 50% solution in a mixture of equal parts of butanol and xylol, of a butylated melamine-formaldehyde resin. This resin, which is designed for use in formulating baking coatings, is produced by Monsanto Chemical Co. of St. Louis, Mo. The solution was permitted to stand for 24 hours, following which it was applied with a 1.5 mil wet film applicator onto glass, clean 30 ga. tin and solvent sanded 20 ga. steel plates. The coatings were air dried for 1 hour, baked at 150° C. for 2 hours, and permitted to stand for 24 hours. Following this they were evaluated. See Table I for results.

EXAMPLE 2

60 parts by weight of a peracetic acid epoxidized, 70 butadiene-30 styrene copolymer having a molecular weight of about 1,500 and an epoxy content of 4.8% (70% of the active oxygen employed in epoxidation), and 40 g. of soya fatty acids were mixed and reacted as described in Example 1. In this case the reaction was carried out at 220° C. for 4 hours.

A 70% solution of the reaction product was prepared in xylene. This solution was coated onto plates as described in Example 1, in this case using a 1.3 mil wet film applicator, the resulting films were air dried for 1 hour, were baked at 140° C. for 30 minutes and were permitted to stand for 24 hours at room temperature. The films were then evaluated. See Table I for results.

EXAMPLE 3

55 g. of a perbutyric acid epoxidized 70 butadiene-30 styrene copolymer having a molecular weight of about 2,500 and an epoxy content of 5.2% (80% of the active oxygen employed in epoxidation), and 45 g. of dehydrated castor oil acids were mixed and reacted as described in Example 1, in this case at 220° C. for 2 hours.

A 60% solution of the product in a two to one mixture of xylene and mineral spirits B was prepared, and 50 g. of this solution was mixed with 0.25 g. of 6% cobalt octoate. The solution was coated onto plates as described in Example 1 in this case using a 2 mil wet film applicator, and the resulting films were air dried for 7 days at room temperature. The films then were evaluated. See Table I for results.

EXAMPLE 4

The resin ester of Example 3, in the form of a 60% solution in xylene and mineral spirit B, was coated onto plates as described in Example 1, in this case using a 2 mil applicator. The resulting films were air dried for 1 hour, baked at 150° C. for 30 minutes, and permitted to stand for 24 hours. Following this the films were evaluated. See Table I for results.

EXAMPLE 5

40 g. of a 60% solid solution of the resin ester of Example 3 in a two to one mixture of xylene and mineral spirits B, was mixed with 10 g. of Melmac 243-3 and 0.025 g. of a 6% solution of cobalt octoate. The Melmac 243-3 is a 60% solids solution in aromatic solvents of a melamine-formaldehyde thermosetting resin and is produced by American Cyanamid Company of New York, N.Y. This solution was coated onto plates as described in Example 1, the resulting films were dried for 1 hour, were baked at 140° C. for 30 minutes, and were permitted to stand for 24 hours at room temperature. The films then were evaluated. See Table I for results.

EXAMPLE 6

65 g. of a perpelargonic acid epoxidized 50 butadiene-50 styrene copolymer having an epoxy content of 3.05% (85% of the active oxygen employed in the epoxidation), and 35 g. of dehydrated castor oil acids were mixed and reacted as described in Example 1, in this case at 210° C. for 90 minutes.

A 50% solution of the reaction product in toluene was prepared, and 85 g. of this solution was mixed with 15 g. of Resimene 875. The resulting solution was coated onto plates as described in Example 1, and the resulting coatings were air dried for 1 hour, baked at 150° C. for 2 hours, and permitted to stand for 24 hours. Following this the films were evaluated. See Table I for results.

EXAMPLE 7

13 g. of a peracetic acid epoxidized 85 styrene-15 butadiene copolymer having a molecular weight of about 150,000 and an epoxy content of 2.15% (51% of the active oxygen employed in the epoxidation), 7.7 g. of linseed fatty acids and 3 g. of rosin were dissolved in 43 g. of toluene. This solution then was treated according to the reaction process described in Example 1, in this case being heated at 125° C. for about 9 hours.

A 50% solution of the product in xylene was prepared, and 10 g. of this solution was mixed with 0.05 g. of 6% cobalt octoate. This solution was coated onto plates as described in Example 1, and the films were air dried for 24 hours at room temperature. Following this the films were evaluated. See Table I for results.

EXAMPLE 8

98 g. of a peracetic acid epoxidized 70 butadiene-30 styrene copolymer having a molecular weight of about 1,500 and an epoxy content of 5.25% (80% of the active oxygen introduced in epoxidation), and 27 g. of dehydrated castor oil acids were mixed and reacted as described in Example 1, in this case at 220° C. for 30 minutes. The product of this reaction had a residual epoxy content of 2.5%.

A 60% solution of the reaction product in a 1:1 mixture of xylene and ethylene glycol monoethyl ether was prepared, and 2.33 g. of Bakelite BR-254 resin were added to 12 g. of this solution. The Bakelite BR-254 is a 100% para-phenyl-phenolic oil soluble resin, prepared by reaction of para-phenyl-phenol with formaldehyde, and is produced by the Bakelite Division of Union Carbide and Carbon Corp., New York, N.Y. It acts as a polyphenol curing agent for the epoxy containing ester. The produced solution was coated onto plates as described in Example 1, and the resulting coatings were air dried for 1 hour, baked at 140° C. for 30 minutes, and permitted to stand for 24 hours. Following this the films were evaluated. See Table I for results.

EXAMPLE 9

58 g. of a peracetic acid epoxidized polybutadiene having a molecular weight of about 2,500 and an epoxy content of 4.21% (80% of the active oxygen employed in epoxidation), and 42 g. of dehydrated castor oil acids were mixed and reacted as described in Example 1, in this case at 210° C. for 1½ hours.

A 50% solution of the reaction product was prepared in xylene, and 45 g. of this solution was mixed with 5 g. of Beetle Resin 227–8. The Beetle Resin is a 50% solids solution of a thermosetting urea-formaldehyde resin in a 3:2 mixture of butyl alcohol and xylene, and is produced by the American Cyanamid Company of New York, N.Y. This solution was coated onto plates as described in Example 1, in this case using a 2 mil wet film applicator, the resulting films were air dried for 1 hour, were baked at 150° C. for 2 hours and were permitted to stand at room temperature for 24 hours. The films then were evaluated. See Table I for results.

EXAMPLE 10

55 parts of a peracetic acid epoxidized copolymer of butadiene styrene and acrylonitrile, composed of 30 parts of butadiene, 50 parts of styrene and 20 parts of acrylonitrile and having a molecular weight of about 50,000 and an epoxy content of 3% (60% of the total oxygen employed in epoxidation), was mixed and reacted with 45 g. of dehydrated castor oil acids. The reaction was conducted as described in Example 1, in this case being run for 3½ hours at 185° C.

A 50% solution of the reaction product was prepared in xylene, and 35 g. of this solution was mixed with 15 g. of Resimene 875. The Resimene 875 is a butylated melamine formaldehyde resin, supplied as a 50% solids solution in equal parts of butanol and xylol. This resin, which is useful in the formation of baking finishes, is produced by the Monsanto Chemical Company of St. Louis, Missouri. This solution was coated onto plates as described in Example 1, in this case using a 3 mil wet film applicator. The coatings were air dried for 48 hours, following which they were baked at 300° F. for 30 minutes. The films were then permitted to stand at room temperature for 24 hours, and thereafter were evaluated. See Table I for results.

oxygen on adjacent carbon atoms in the amount of at least 1% by weight and to the extent of at least 50% of the peracid-introduced oxygen therein, with (b) a fatty acid having 12 to 24 carbon atoms.

2. The process for forming a soluble synthetic ester useful in forming infusible and insoluble coatings, which comprises mixing and reacting (a) the reaction product of a lower aliphatic peracid having 2 to 9 carbon atoms with a polybutadiene having a molecular weight as measured by intrinsic viscosity method of 250 to 250,000, said reaction product containing epoxy oxygen on adjacent carbon atoms in the amount of at least 1% by weight and to the extent of at least 50% of the peracid-introduced oxygen therein, with (b) a fatty acid having 12 to 24 carbon atoms.

3. The process for forming a soluble synthetic ester useful in forming infusible and insoluble coatings, which comprises mixing and reacting (a) the reaction product of a lower aliphatic peracid having 2 to 9 carbon atoms with a copolymer of a butadiene and an ethylene monomer containing the $CH_2=CH-$ group, said copolymer having a molecular weight as measured by intrinsic viscosity method of 250 to 250,000, and said reaction product containing epoxy oxygen on adjacent carbon atoms in the amount of at least 1% by weight and to the extent of at least 50% of the peracid-introduced oxygen therein, with (b) a fatty acid having 12 to 24 carbon atoms.

4. The process for forming a soluble synthetic ester useful in forming infusible and insoluble coatings, which comprises mixing and reacting (a) the reaction product of a lower aliphatic peracid having 2 to 9 carbon atoms with a copolymer of butadiene and styrene, said copolymer having a molecular weight as measured by intrinsic viscosity method of 250 to 250,000, and said reaction product containing epoxy oxygen on adjacent carbon atoms in the amount of at least 1% by weight and to the extent of at least 50% of the peracid-introduced oxygen therein, with (b) a fatty acid having 12 to 24 carbon atoms.

*Table I*

| Sample | Acid # Reaction Mixture | Acid # Ester | Gardner [1] Color | Sward Rocker Hardness on Steel | Impact [2] on Steel in Lbs. | Flexibility [3] on Tin Plates Passed, inches | Chemical Resistance [4] (18 Hrs.) | | | Remarks |
| | | | | | | | 5% HCl | 5% NaOH | Toluene | |
| --- | --- | --- | --- | --- | --- | --- | --- | --- | --- | --- |
| Ex. 1 | 64 | 42 | 9+ | 48 | ---- | 1 | 2 | 4 | 1 | Very hard, slightly brittle, good adhesion. |
| Ex. 2 | 80 | 7.6 | ---- | 34 | 40 | ⅛ | 1 | 4 | 4 | Hard, tough, flexible, good adhesion and gloss. |
| Ex. 3 | 90 | 17 | 10 | 30 | 30–40 | ⅛ | 1 | 8 | 2–3 | Hard, tough, flexible, good adhesion. |
| Ex. 4 | 90 | 17 | 10 | 38 | 160 | ⅛ | 1 | 5 | 2 | Very hard, very tough, excellent adhesion, glossy. |
| Ex. 5 | 90 | 17 | 10 | 40 | 160 | ⅛ | 1 | 1–2 | 2–3 | Do. |
| Ex. 6 | 70 | 11.9 | 10 | 40 | ---- | ⅛ | 1 | 1 | 6 | Hard, slightly tough, good adhesion. |
| Ex. 7 | 90 | 9.9 | ---- | 48 | ---- | ¼ | 1 | 3 | 3 | Hard, tough coating, good adhesion. |
| Ex. 8 | 43 | 8.4 | ---- | 35 | ---- | ⅛ | 1 | 1 | 4 | Hard, tough flexible coating. |
| Ex. 9 | 83 | 25 | 9 | 40 | ---- | ⅛ | 1 | 1 | 1 | Hard, tough flexible coating, good adhesion. |
| Ex. 10 | 90 | 62.5 | 18 | 55 | ---- | ½ | 1–2 | 1–2 | 1–2 | Hard, tough, fair adhesion. |

[1] Color of a 50–80% solution in xylene.
[2] Gardner 160 inch pound variable impact tester.
[3] Plates folded 180° around a mandrel of indicated diameter; coating did not crack.
[4] 1 represents complete resistance to attack, 10 complete solution of films laid down on steel plates.

What is claimed is:

1. The process for forming a soluble synthetic ester useful in forming infusible and insoluble coatings, which comprises mixing and reacting (a) the reaction product of a lower aliphatic peracid having 2 to 9 carbon atoms with a conjugated diene polymer having a molecular weight as measured by intrinsic viscosity method of 250 to 250,000, said reaction product containing epoxy 5. The process for forming a soluble composition useful in producing insoluble and infusible surface coatings by a process of mixing and reacting together (a) the reaction product of a lower aliphatic peracid having 2 to 9 carbon atoms with a conjugated diene polymer having a molecular weight as measured by intrinsic viscosity method of 250 to 250,000, said reaction product containing epoxy oxygen on adjacent carbon atoms in the amount of at least 1% by weight and to the extent of at least 50% of the peracid-introduced oxygen therein, with (b) a fatty acid, having 12 to 24 carbon atoms wherein said composition has an acid number of at least about 15 and no more than about two-thirds of the acid number of the mixture of (a) and (b) from which it was formed.

6. Method of preparing a soluble synthetic ester useful in forming infusible and insoluble coatings, comprising reacting together for about ½ to 9 hours and at about 100° C. to 220° C. (a) the reaction product of a lower aliphatic peracid having 2 to 9 carbon atoms, with a conjugated diene polymer having a molecular weight as measured by intrinsic viscosity method of 250 to 250,000, said reaction product containing epoxy oxygen on adjacent carbon atoms in the amount of at least 1% by weight and to the extent of at least 50% of the peracid-introduced oxygen therein, and (b) a fatty acid having 12 to 24 carbon atoms.

7. Synthetic soluble ester useful in forming insoluble and infusible coatings, and formed by reaction for about ½ to 9 hours at about 100° C. to 220° C., of (a) the reaction product of a lower aliphatic peracid having 2 to 9 carbon atoms with a conjugated diene polymer having a molecular weight as measured by intrinsic viscosity method of 250 to 250,000, said reaction product containing epoxy oxygen on adjacent carbon atoms in the amount of at least 1% by weight and to the extent of at least 50% of the peracid-introduced oxygen therein, with (b) a fatty acid having 12 to 24 carbon atoms.

References Cited in the file of this patent

UNITED STATES PATENTS

| | | |
|---|---|---|
| 1,988,448 | Hopff et al. | Jan. 22, 1935 |
| 2,469,847 | Rumscheidt et al. | May 10, 1949 |
| 2,634,256 | Sparks et al. | Apr. 7, 1953 |
| 2,660,563 | Banes et al. | Nov. 24, 1953 |
| 2,692,892 | Hillyer et al. | Oct. 26, 1954 |
| 2,826,556 | Greenspan et al. | Mar. 11, 1958 |
| 2,921,947 | Millar et al. | Jan. 19, 1960 |